United States Patent
Seidel et al.

(10) Patent No.: US 9,416,236 B2
(45) Date of Patent: Aug. 16, 2016

(54) FIBER REINFORCED PLASTICS MATERIAL AND METHOD FOR PRODUCTION THEREOF

(75) Inventors: Christian Seidel, Schwaig (DE); Heinrich Zeininger, Obermichelbach (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 13/982,220

(22) PCT Filed: Jan. 16, 2012

(86) PCT No.: PCT/EP2012/050567
§ 371 (c)(1),
(2), (4) Date: Jul. 26, 2013

(87) PCT Pub. No.: WO2012/100997
PCT Pub. Date: Aug. 2, 2012

(65) Prior Publication Data
US 2014/0128501 A1    May 8, 2014

(30) Foreign Application Priority Data

Jan. 28, 2011    (DE) .................. 10 2011 003 312

(51) Int. Cl.
| | |
|---|---|
| C08K 7/02 | (2006.01) |
| C08J 5/04 | (2006.01) |
| C08J 5/06 | (2006.01) |
| C08J 5/24 | (2006.01) |
| C08L 63/00 | (2006.01) |
| C08K 7/06 | (2006.01) |
| C08K 7/14 | (2006.01) |
| C08L 23/26 | (2006.01) |
| C08L 25/06 | (2006.01) |
| C08L 67/02 | (2006.01) |
| C08L 77/00 | (2006.01) |

(52) U.S. Cl.
CPC *C08J 5/046* (2013.01); *C08J 5/042* (2013.01); *C08J 5/043* (2013.01); *C08J 5/06* (2013.01); *C08J 5/24* (2013.01); *C08K 7/02* (2013.01); *C08K 7/06* (2013.01); *C08K 7/14* (2013.01); *C08L 23/26* (2013.01); *C08L 25/06* (2013.01); *C08L 63/00* (2013.01); *C08L 67/02* (2013.01); *C08L 77/00* (2013.01)

(58) Field of Classification Search
CPC ................................ C08K 7/02; C08K 9/00
See application file for complete search history.

(56) References Cited

U.S. PATENT DOCUMENTS

| | | |
|---|---|---|
| 2001/0031594 A1 | 10/2001 | Perez et al. |
| 2006/0217482 A1 | 9/2006 | Lukehart et al. |
| 2010/0203331 A1* | 8/2010 | van der Woude ....... C03C 25/26 428/391 |

FOREIGN PATENT DOCUMENTS

| | | |
|---|---|---|
| DE | 202004008122 U1 | 11/2005 |
| DE | 10201100312.2 | 1/2011 |
| EP | 0191680 | 8/1986 |
| EP | 0301765 A2 | 2/1989 |
| EP | 1 475 459 A1 | 11/2004 |
| EP | 1 950 240 A1 | 7/2008 |
| JP | 62-57936 A1 | 3/1987 |
| JP | 1-306431 | 12/1989 |
| WO | 02/077077 A2 | 10/2002 |
| WO | 03/082565 A1 | 10/2003 |
| WO | 2008/012196 A1 | 1/2008 |

OTHER PUBLICATIONS

International Search Report for PCT/EP2012/050567; mailed Dec. 7, 2012.
Office Action for German Application No. 10 2011 003 312.2 dated Jul. 18, 2011.
C. U. Pittmann et al.; "Oxygen Plasma and Isobutylene Plasma Treatments of Carbon Fibers: Determination of Surface Functionality and Effects on Composite Properties", Carbon vol. 36, Nos. 1-2, 1997 Elsevier Science, Ltd., pp. 25-37.
J. R. Brown et al.; "Plasma surface modification of advanced organic fibres"; Part 1 Effects on the mechanical, fracture and ballistic properties of aramid/epoxy composites; 6053 Journal of Materials Science 26; Aug. 1991; No. 15, pp. 4172-4178.

* cited by examiner

*Primary Examiner* — Vickey Nerangis
(74) *Attorney, Agent, or Firm* — Slayden Grubert Beard PLLC

(57) ABSTRACT

In a fibrous planar structure in which fibers are embedded in a matrix, an increase in mechanical resistance is achieved by improving the adhesion between the fiber and the matrix.

22 Claims, 1 Drawing Sheet

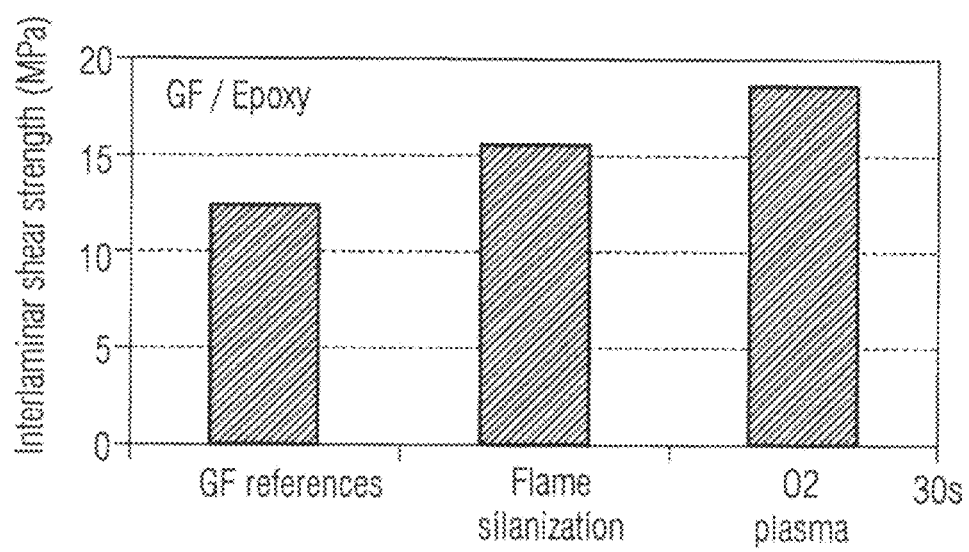

FIBER REINFORCED PLASTICS MATERIAL AND METHOD FOR PRODUCTION THEREOF

CROSS REFERENCE TO RELATED APPLICATIONS

This application is the U.S. national stage of International Application No. PCT/EP2012/050567, filed Jan. 16, 2012 and claims the benefit thereof. The International Application claims the benefit of German Application No. 10 2011 003 312.2 filed on Jan. 28, 2011, both applications are incorporated by reference herein in their entirety.

BACKGROUND

Described below is a fibrous planar structure in which fibers are embedded in a matrix.

Compared with metallic constructional materials, fiber-reinforced plastics materials are characterized by a significantly lower specific weight and higher specific properties.

Fiber-reinforced plastics materials are known for example from DE 20 2004 008 122. They are also referred to as "organo sheets" or "hybrid yarn fabrics" and are employed in aircraft construction, shipbuilding or vehicle manufacturing as well as in the energy industry, generally in lightweight design applications.

A fiber-reinforced plastics (FRP) material is a multiphase or hybrid material composed of at least two main components, a bedding matrix and reinforcing fibers. A resin is used as the bedding matrix, while a glass, carbon and/or aramid fiber for example is used as the fiber. FRP components find application in known static constructions and increasingly also in parts or components subject to dynamic loads, for example in turbine components for power generation including wind turbines, parts for (rail) vehicles, components for electrotechnical devices (transformers, generators, motors) or in photovoltaics.

During production, a fiber is impregnated with or infiltrated by the resin. The fibers generally carry at least a partial coating, such as a so-called size or sizing on the surface for example, which on the one hand ensures a smooth fiber surface for weaving and on the other hand establishes a compatibility with the matrix. The size for example may be wet-chemically applied silane, ester, acrylate or epoxy resin compounds, and others.

There is always the requirement to optimize the rigidity, solidity, tensile strength, (impact) resistance, the improvement in the wetting characteristics of the fiber, as well as the fatigue strength and compactness of the FRP.

SUMMARY

It is therefore desirable to provide an FRP which has improved mechanical properties compared with the prior art.

It is common general knowledge of the inventors that the adhesion between the fiber and the bedding matrix is essential for the mechanical properties of the FRP.

Described below is a fiber-reinforced plastics material formed of fibers and a bedding matrix, wherein the surface of the fiber is activated chemically and/or physically, such that upon contact with the bedding matrix the fiber reacts with the latter and thereby establishes chemical and/or physical bonds with the matrix material. Also described is a method for producing a fiber-reinforced plastics material, wherein the surface of the fiber is physically and/or chemically activated immediately before the fiber is embedded in the matrix.

BRIEF DESCRIPTION OF THE DRAWINGS

These and other aspects and advantages will become more apparent and more readily appreciated from the following description of the exemplary embodiments, taken in conjunction with the accompanying drawing which is a graph of a reference glass fiber with epoxy resin in comparison with the flame-silanized and a plasma-activated surface of the glass fiber.

DETAILED DESCRIPTION OF THE PREFERRED EMBODIMENT

Reference will now be made in detail to the preferred embodiments, examples of which are illustrated in the accompanying drawings, wherein like reference numerals refer to like elements throughout.

Covalent single or multiple bonds are referred to as chemical bonding. Polar or ionogenically structured bonds and hydrogen bonds designate physical, dative covalent bonds.

All types of fibers, in particular high-performance fibers, can be used as the fiber, selected for example from the following group of fibers: carbon fibers, glass fiber, aramid fiber, polymer fibers such as polyethylene fiber, polypropylene fiber, polystyrene fiber, polyethylene terephtalate fiber, ceramic fiber such as silicon carbide fiber, aluminum oxide fibers, or other reinforcing fibers. The fibers can be present in the form of a weave, an interlaced yarn, a multilayer lattice, a mesh, a fiber web, etc.

All types of plastic matrices can be used as the bedding matrix, for example thermoplastics, resins, such as epoxy resins, unsaturated polyester (UP) resins, vinyl ester (VE) resins, duromers, thermosetting resins and/or synthetic resins. The resins can contain all types of fillers. According to an embodiment variant, nanoscale particles are incorporated into the bedding matrix, which is to say for example the resin.

According to an embodiment variant, the fibers are coated such that for example a size is applied to the fiber in a wet-chemical process and sheathes the fiber.

The size is composed for example of silane or epoxy resin materials. Further examples are acrylate ester compounds and polyurethane as well as the entire gamut of polymer resin systems which can be applied to the fibers as a solution or in a dispersion.

"Chemical activation" denotes for example the contacting of the coated or uncoated reinforcing fiber with acids, oxidizing acids, bases, reducing bases, flame silanization, or similar.

"Physical activation" refers for example to activation through introduction into a plasma, for example exposure to a low-pressure or atmospheric-pressure plasma. Furthermore, corona systems are also suitable for physical surface activation.

As a result of the chemical and/or physical activation of the surface of the fiber, which is also coated for example, the fiber is placed into a reactive state, in other words brought to an energetic peak, such that it exhaustively reacts with everything that it comes into contact with and consequently drops into an energy trough. Accordingly, the contacting with the bedding matrix may follow immediately after the activation such that the reaction takes place with the matrix and not with the surrounding gases or moisture.

The fiber-reinforced plastics material may be produced in such a way that the surface of the fiber is physically and/or chemically activated immediately before the fiber is embedded in the matrix.

Through the physical activation by plasma it is also possible to deposit a thin organic or inorganic film from the plasma, which film then forms the reactive fiber surface, this also being referred to as a plasma coating.

Significant improvements in organo-sheet materials are achieved, in particular with regard to the wetting characteristics of the fibers, consequently promoting better infiltration of the polymer matrix improvement in static mechanical structural properties modulus, strength, elasticity, shear force and bending improvement in dynamic mechanical properties: the fatigue strength under cyclic or fluctuating load can be increased in respect of tensile stress, bending and shear stress.

It will be shown hereinbelow with reference to a figure how the strength of the FRP was successfully increased through the activation of the fiber surface and subsequent improved adhesion between fiber and bedding matrix:

The reference had a strength of 12.42 MPa. A pretreatment technique known as the pyrosil process, entailing the deposition of a silicate layer improving the hydrophilic properties, therefore also referred to as flame silanization, enabled this strength value to be increased by 25%, and by 33% through 100 seconds in the plasma, and by 50% through 30 seconds in the plasma.

As described herein, increases in strength can be achieved by improving the adhesion between the fiber and the bedding matrix in FRPs.

The fibrous planar structure in which fibers are embedded in a matrix have an increase in mechanical resistance that is achieved through improvement of the adhesion between the fiber and the matrix. Improved fiber/matrix adhesion is demonstrated for example by interlaminar shear strength testing, also called splitting tensile strength or transverse fiber bundle test (TFBT).

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A fiber-reinforced plastics material, comprising:
a bedding matrix; and
fibers embedded in the bedding matrix and coated with a size which placed the fibers into a reactive state prior to embedding in the bedding matrix, the fibers being selected from the group consisting of carbon fibers, aramid fibers, and polymer fibers, the size having undergone surface activation by at least one of plasma treatment, corona modification, acid/base modification, oxidative modification, reductive modification, flame silanization and flame impingement prior to embedding of the fibers coated with the size in the bedding matrix, such that upon contact with the bedding matrix, the size reacted with and established chemical and/or physical bonds with the bedding matrix and improved adhesion between the size and the bedding matrix has been obtained as compared to baseline adhesion between the size and the bedding matrix without the surface activation.

2. The fiber-reinforced plastics material as claimed in claim 1, wherein the fibers include at least one polymer fiber selected from the group consisting of polyethylene fiber, polypropylene fiber, polystyrene fiber and polyethylene terephtalate fiber.

3. The fiber-reinforced plastics material as claimed in claim 2, wherein the bedding matrix is at least one matrix selected from the group consisting of: thermoplastics, epoxy resins, unsaturated polyester resins, vinyl ester resins, duromers, thermosetting resins and synthetic resins.

4. The fiber-reinforced plastics material as claimed in claim 3, wherein the size is a compound applied in a wet-chemical process.

5. The fiber-reinforced plastics material as claimed in claim 4, wherein the size is one of a silane, an ester, an acrylate and an epoxy resin compound.

6. The fiber-reinforced plastics material as claimed in claim 1, further comprising a silicate layer formed on a surface of the size and treated with the plasma treatment prior to the embedding in the bedding matrix.

7. The fiber-reinforced plastics material as claimed in claim 1, wherein
the size has undergone surface activation by the plasma treatment, and
the fiber-reinforced plastics material further comprises a plasma coating deposited on the size, the plasma coating having been deposited by the plasma treatment prior to the embedding.

8. A fiber-reinforced plastics material produced by a method comprising:
selecting reinforcing fibers, having a surface, from the group consisting of carbon fiber, aramid fiber and polymer fiber;
coating the reinforcing fibers with a size to place the fibers into a reactive state;
activating a surface of the size by at least one of plasma treatment, corona modification, acid/base modification, oxidative modification, reductive modification, flame silanization and flame impingement; and
embedding the reinforcing fibers in a bedding matrix after said activating, to establish chemical and/or physical bonds with the bedding matrix, such that the activating resulted in improved adhesion between the size and the bedding matrix as compared to baseline adhesion between the size and the bedding matrix without the activating.

9. The fiber-reinforced plastics material as claimed in claim 8, wherein said embedding is performed immediately after said activating.

10. The fiber-reinforced plastics material as claimed in claim 9, wherein said activating of the surface of the reinforcing fibers includes at least one of plasma treatment and contact with at least one of an acid and a base.

11. The fiber-reinforced plastics material as claimed in claim 10, wherein the reinforcing fiber is at least one polymer fiber selected from the group consisting of polyethylene fiber, polypropylene fiber, polystyrene fiber and polyethylene terephtalate fiber.

12. The fiber-reinforced plastics material as claimed in claim 11, wherein the bedding matrix is at least one matrix selected from the group consisting of:
thermoplastics, epoxy resins, unsaturated polyester resins, vinyl ester resins, duromers, thermosetting resins and synthetic resins.

13. The fiber-reinforced plastics material as claimed in claim 12, wherein said coating comprises applying a compound as the size in a wet-chemical process.

14. The fiber-reinforced plastics material as claimed in claim 13, wherein the compound is one of a silane, an ester, an acrylate and an epoxy resin.

15. The fiber-reinforced plastics material as claimed in claim 8, wherein the activating the surface is by the plasma treatment depositing a plasma coating on the size prior to the embedding.

16. A method for producing a fiber-reinforced plastics material, comprising:
  selecting reinforcing fibers, having a surface, from the group consisting of carbon fiber, aramid fiber and polymer fiber;
  coating the reinforcing fibers with a size to place the fibers into a reactive state;
  activating a surface of the size by at least one of plasma treatment, corona modification, acid/base modification, oxidative modification, reductive modification, flame silanization and flame impingement; and
  embedding the reinforcing fibers in a bedding matrix immediately after said activating, to establish chemical and/or physical bonds with the bedding matrix, such that the activating results in improved adhesion between the size and the bedding matrix as compared to baseline adhesion between the size and the bedding matrix without the activating.

17. The method as claimed in claim 16, wherein said embedding is performed immediately after said activating.

18. The method as claimed in claim 17, wherein said activating of the surface of the reinforcing fibers includes at least one of plasma treatment and contact with at least one of an acid and a base.

19. The method as claimed in claim 18, wherein the reinforcing fiber is at least one polymer fiber selected from the group consisting of polyethylene fiber, polypropylene fiber, polystyrene fiber and polyethylene terephtalate fiber.

20. The method as claimed in claim 19, wherein the bedding matrix is at least one matrix selected from the group consisting of: thermoplastics, epoxy resins, unsaturated polyester resins, vinyl ester resins, duromers, thermosetting resins and synthetic resins.

21. The method as claimed in claim 20, wherein said coating comprises applying a compound as the size in a wet-chemical process.

22. The method as claimed in claim 21, wherein the compound is one of a silane, an ester, an acrylate and an epoxy resin.

* * * * *